United States Patent Office 3,751,462
Patented Aug. 7, 1973

3,751,462
PROCESS FOR PREPARATION OF SUBSTITUTED
FLUOROMETHANESULFONANILIDES
Kelly T. McGurran, Roseville, and Elden H. Banitt,
Woodbury, Minn., assignors to Riker Laboratories, Inc.,
Northridge, Calif.
No Drawing. Filed Sept. 27, 1971, Ser. No. 184,230
Int. Cl. C07c 143/74
U.S. Cl. 260—556 A                6 Claims

ABSTRACT OF THE DISCLOSURE

A novel process for the synthesis of the compound 2-hydroxy-5-[1-hydroxy - 2 - (4′-methoxyphenethylamino)propyl]fluoromethanesulfonanilide and its salts, together with certain novel intermediates, is described.

BACKGROUND OF THE INVENTION

Processes for the synthesis of substituted sulfonanilides of the type of the compound synthesized by the process of this invention are known, for example see U.S. Pat. No. 3,341,584. The process of the present invention provides a novel route with improved yields and good purity of the final product.

DETAILED DESCRIPTION OF THE INVENTION

This invention relates to a novel process for the preparation of the compound 2 - hydroxy - 5 - [1 - hydroxy-2 - (4′ - methoxyphenethylamino)propyl]fluoromethanesulfonanilide and its salts. This invention also relates to novel intermediates useful for the preparation of the final product compounds of the invention.

The intermediates and final product compounds of the present invention are prepared using the reaction sequence illustrated below starting with the known compounds 3-amino-4-benzyloxypropiophenone and fluoromethanesulfonyl chloride.

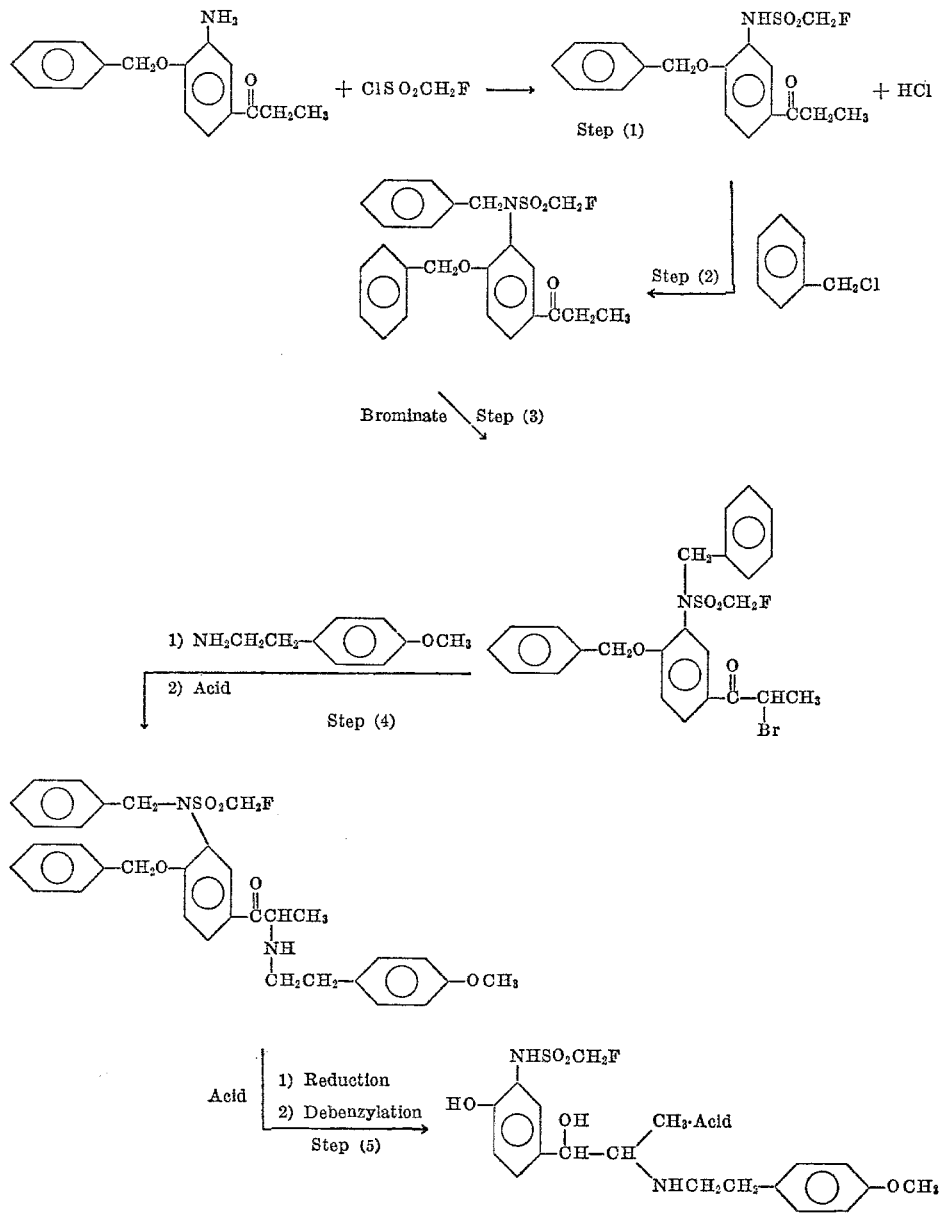

In step (1) approximately equivalent amounts of 3-amino-4-benzyloxypropiophenone and fluoromethanesulfonyl chloride are brought together at temperatures ranging between −15 and 100° C. The bromide or fluoride could be used rather than the chloride, but the chloride is preferred. Since the reaction is slightly exothermic at about room temperature, about 25° C. is the preferred temperature. The reaction is preferably, but not necessarily, carried out in the presence of an acid acceptor such as the alkali or alkaline earth metal carbonates and bicarbonates or a tertiary amine such as pyridine, triethylamine or N,N-dimethylaniline. The amount of the acid acceptor can be varied widely; however, a 10 mole percent excess of that amount of base sufficient to bind the liberated strong acid is routinely used.

The sulfonylation of step (1) is usually conducted in the presence of an appropriate inert organic solvent. Typical solvents suitable for this purpose are dichloromethane, chloroform, carbon tetrachloride, benzene, toluene, bis(2-methoxyethyl)ether, acetonitrile and the like.

After reaction is complete, if the reaction solvent is not water-miscible, the product mixture can be extracted with a dilute aqueous base solution. The product, in the form of a salt which is soluble in the aqueous layer, is precipitated therefrom by addition of a mineral acid such as hydrochloric or sulfuric acid, and collected by filtration. Alternatively, and preferably, the reaction mixture can be washed with aqueous hydrochloric acid, and the solvent evaporated in vacuo to give the product. The product may be further purified if necessary by conventional methods such as elution chromatography, formation of the basic form and reprecipitation of the acid form, or most conveniently and for most purposes satisfactorily, recrystallization, for example from ethanol.

If the reaction solvent is water-miscible, the product compound is obtained by dilution of the reaction mixture with water. The product is separated and purified by conventional methods. The product, 2-benzyloxy-5-propionylfluoromethanesulfonanilide, is a crystalline solid.

In step (2) the N-benzylation is carried out in the presence of sodium iodide as a catalyst and a weak base, such as alkali metal carbonates. The function of the weak base, which is preferably an inorganic base, is primarily to react with the HCl formed in the reaction. The product of step (1) reacts with benzyl chloride in, for example, a glyme-water mixture or other inert aqueous solvent, at temperatures from about 25 to 150° C., reflux temperature of the solvent. The reaction time is of the order of hours, ranging up to one day, depending on the temperatures employed. The product is separated by extraction into dichloromethane or other organic solvents and recrystallized, for example, from ethanol.

In step (3) bromination is readily carried out by one of two methods. The preferred method used is reaction of the product of step (2) with cupric bromide. Slightly less than 2 moles of bromide per mole of ketone is used. The reaction mixture is heated for several hours at moderate temperatures (for example 50 to 100° C.). A suitable non-reactive solvent such as dichloromethane, chloroform, ethyl acetate and the like is used. The product is isolated from the solvent and purified by conventional methods such as recrystallization or elution chromatography. Ethanol has been found to be a suitable recrystallization solvent for the solid product of step (3), N-benzyl-2-benzyloxy-5-(2-bromopropionyl)fluoromethanesulfonanilide.

Another bromination method requires the use of liquid bromine and aluminum chloride as a catalyst. An equimolar amount of bromine is used, and a small amount of catalyst, for example 5 to 10 weight percent relative to bromine. The reaction occurs rapidly and can be followed by color changes of the solution. An inert solvent such as diethyl ether is generally used. Moderate temperatures, e.g. 20 to 100° C., are employed. The product is isolated by evaporation of the solvent and purified as described hereinabove.

In step (4) 4-methoxyphenethylamine is reacted with the product of step (3) at about 25° C., although temperatures of −20 to +50° C. may be used. This reaction is carried out in a nonreactive organic solvent (i.e. inert to the reactants and product) such as methanol, ethanol and acetonitrile. After stirring the mixture for up to six hours to insure completion of the reaction, the precipitated 4-methoxyphenethylamine hydrobromide is removed by filtration, an acid (such as hydrochloric, hydrobromic, phosphoric, sulfuric and the like) is added to form the corresponding acid addition salt of the amine product. Organic acids, e.g. acetic or propionic acid, may also be used. Preferably, the acid used is a pharmaceutically acceptable acid so that the product of the process ultimately is a pharmaceutically acceptable acid addition salt of the basic compound 2-hydroxy-5-[1-hydroxy-2-(4′-methoxyphenethylamino) propyl] fluoromethanesulfonanilide. In general, 2 equivalents of 4-methoxyphenethylamine have been used, and the product may be isolated by crystallization, extraction or column chromatography. The salts of N-benzyl - 2 - benzyloxy-5-[2-(4′-methoxyphenethylamino)propionyl]fluoromethanesulfonanilide are solids.

In step (5) the ketone acid addition salt of step (4) may be reduced chemically, for example with sodium borohydride, followed by debenzylation by treatment with hydrogen and palladium on charcoal, most conveniently at ambient temperatures, generally between 0 and 100° C., to give the acid addition salt of 2-hydroxy-5-[1-hydroxy-2-(4′ - methoxyphenethylamino)propyl]fluoromethanesulfonanilide. Alternatively, and preferably, the ketone product of step (3) may be both reduced and debenzylated in one step by reduction with hydrogen and palladium on charcoal. The product isolated from step (5) is the acid addition salt of 2-hydroxy-5-[1-hydroxy-2-(4′-methoxyphenethylamino)propyl]fluoromethanesulfonanilide.

Acid addition salts of the product of step (5) are readily converted to the free base. This can be done, for example, by neutralizing a solution of the salt in water with an equimolar solution of sodium bicarbonate and azeotroping off the water with benzene. The residue is extracted with acetone, then the acetone is evaporated to give 2-hydroxy-5-[1-hydroxy - 2 - (4′ - methoxyphenethylamino) propyl] fluoromethanesulfonanilide as a white solid. The compound and its pharmaceutically acceptable salts have useful physiological action as bronchodilators in the mammalian organism.

The final compound provided by the process of this invention is an amphoteric substance, forming salts with both acids and bases. The acidic portion of the molecule is the —NH— of the fluoromethanesulfonamido group, from which the hydrogen atom is readily ionized as a proton leaving a negatively charged nitrogen. Surprisingly, it has been found that when this acidic site of the intermediate 2 - benzyloxy-5-propionylfluoromethanesulfonanilide is "blocked" by a substituent group which is easily removed at a later step in the reaction sequence, the subsequent intermediates are more easily purified and there is significant improvements of yields over those obtained by the methods of the art.

Example 1

To a stirred solution of 3-amino-4-benzyloxypropiophenone (80 g., 0.31 mole), dimethylaniline (41.2 g., 0.34 mole) and chloroform (400 ml.) is added dropwise fluoromethanesulfonyl chloride (41.2 g., 0.31 mole) over a period of thirty minutes. A slight exotherm results. The solution is stirred for about 64 hours. The solution is washed with dilute hydrochloric acid, washed with water and dried over magnesium sulfate. The solvent is evaporated in vacuo, yielding 120 g. of a yellowish solid. Recrystallization from ethanol gives 85 g. (78 percent) of 2 - benzyloxy - 5 - propionylfluoromethanesulfonanilide, M.P. 110–111° C.

*Analysis.*—Calcd. for $C_{17}H_{18}FNO_4S$ (percent): C, 58.1; H, 5.2. Found (percent): C, 58.6; H, 5.3.

Example 2

To a stirred solution of potassium carbonate (2.07 g., 15 mmoles) and sodium iodide (0.10 g.) in water (10 ml.) is added 2-benzyloxy-5-propionylfluoromethanesulfonanilide (3.51 g., 10 mmoles) and benzyl chloride (1.52 g., 12 mmoles) in glyme (15 ml.). The mixture is heated to its reflux temperature and maintained at reflux for one day, cooled to room temperature and evaporated under vacuum. The residue is extracted with dichloromethane, and the organic extract is washed with water, 10 percent sodium hydroxide solution and water. The organic solution is evaporated under vacuum to an oil which solidifies slowly. Recrystallization from ethanol and treatment with decolorizing charcoal (twice) provide ivory-colored needles (2.6 g., 59 percent) of N-benzyl-2-benzyloxy-5-propionylfluoromethanesulfonanilide, M.P. 90–91.5° C.

*Analysis.*—Calcd. for $C_{24}H_{24}FNO_4S$ (percent): C, 65.3; H, 5.5; N, 3.2. Found (percent): C, 65.0; H, 5.6; N, 3.1.

Example 3

To a refluxing solution of cupric bromide (4.24 g., 19 mmoles) in ethyl acetate (15 ml.) is added dropwise a solution of N-benzyl-2-benzyloxy - 5 - propionylfluoromethanesulfonanilide (4.4 g., 10 mmoles) in chloroform (15 ml.). The mixture is maintained at reflux for six hours, cooled and filtered. The filtrate is diluted with chloroform (30 ml.), washed with water, 5 percent sodium bicarbonate solution, then with water again. After drying, the organic solution is evaporated under vacuum. The crude product (7.8 g.) is recrystallized from ethanol with treatment with decolorizing charcoal (twice) to provide 1.3 g. (25 percent) of N-benzyl-2-benzyloxy-5-(2-bromopropionyl)fluoromethanesulfonanilide, M.P. 108–109° C.

*Analysis.*—Calcd. for $C_{24}H_{23}BrFNO_4S$ (percent): C, 55.4; H, 4.5; N, 2.7. Found (percent): C, 55.7; H, 4.6; N, 2.5.

Example 4

To a stirred solution of 2-(4-methoxyphenyl)ethylamine (6.05 g., 40 mmoles) in acetonitrile (40 ml.) is added dropwise a solution of N-benzyl-2-benzyloxy-5-(2-bromopropionyl)fluoromethanesulfonanilide (10.4 g., 20 mmoles) in acetonitrile (40 ml.). The solution is stirred for an additional 1.5 hours, then poured into diethyl ether (750 ml.). The mixture is filtered, then the filtrate is evaporated under vacuum. The residue from the evaporation is dissolved in dichloromethane; the solution is washed with water, dried, then partially evaporated under vacuum to a volume of 30 to 40 ml. This solution is added to 750 ml. of diethyl ether saturated with hydrogen chloride. The crude product (9.1 g., 73 percent) separates on cooling, is isolated by filtration, and dissolved in acetonitrile (120 ml.). The solution is warmed on a steam bath, then cooled. An ivory-white solid (6.6 g., 53 percent) precipitates and is isolated by filtration and dried. The infrared spectrum of the product is consistent with that expected for N-benzyl-2-benzyloxy-5-[2-(4' - methoxyphenethylamino)propionyl]fluoromethanesulfonanilide hydrochloride, M.P. 213–216° C.

Example 5

A solution of N-benzyl-2-benzyloxy-5-[2-(4'-methoxyphenethylamino) propionyl] fluoromethanesulfonanilide hydrochloride (23 g., 37 mmoles) in ethanol:water (90:10, 1200 ml.) is obtained by warming the mixture. After cooling to 25° C. the solution is added to a paste of 2.0 g. 10 percent palladium on charcoal in water in a hydrogenation bottle. The mixture is hydrogenated for 16.5 hours on a Parr apparatus at about 40 p.s.i. of hydrogen. The mixture is carefully and thoroughly filtered, and the filtrate is evaporated under vacuum. The crude product (17 g., 100 percent) is dried by azeotropic distillation with benzene, then dissolved in acetonitrile and treated twice with decolorizing charcoal. Slow cooling provides the desired product as white crystals after filtration and drying (13 g., 80 percent). Another recrystallization provides white crystals of 2-hydroxy-5-[1-hydroxy - 2 - (4'-methoxyphenethylamino)propyl]fluoromethanesulfonanilide hydrochloride, M.P. 180–183° C.

*Analysis.*—Calcd. for $C_{19}H_{25}FN_2O_5S \cdot HCl$ (percent): C, 50.8; H, 5.8; N, 6.2. Found (percent): C, 50.9; H, 5.6; N, 6.2.

What is claimed is:
1. Process for preparing 2-hydroxy-5-[1-hydroxy-2-(4' - methoxyphenethylamino)propyl]fluoromethanesulfonanilide which comprises the steps of:
   (1) reacting 3-amino-4-benzyloxypropiophenone with fluoromethanesulfonyl chloride in inert organic solvent solution at a temperature in the range of about −15 to 100° C. to form 2-benzyloxy-5-propionylfluoromethanesulfonanilide;
   (2) treating the product of step 1 with benzyl chloride in the presence of sodium iodide and a weak base in inert aqueous solvent solution at a temperature ranging from about 25 to 150° C. to form N-benzyl-2-benzyloxy-5-propionylfluoromethanesulfonanilide;
   (3) brominating the product of step 2 at temperatures ranging from 20 to 100° C. to form N-benzyl-2-benzyloxy - 5 - (2-bromopropionyl)fluoromethanesulfonanilide;
   (4) reacting the product of step 3 with 4-methoxyphenethylamine in inert organic solvent solution at a temperature in the range of about −20 to 50° C. followed by addition of an acid, to form the corresponding acid addition salt of N-benzyl-2-benzyloxy-5 - [2 - (4' - methoxyphenethylamino)propionyl] fluoromethanesulfonanilide; and
   (5) hydrogenation and debenzylation of the product of step 4 by treating said product with reducing agent at temperatures in the range of about 0 to 100° C. to form the acid addition salt of 2-hydroxy-5-[1-hydroxy - 2 - (4' - methoxyphenethylamino)propyl]fluoromethanesulfonanilide.

2. Process according to claim 1, wherein the product of step 5 is treated with a base to form the free base 2-hydroxy-5-[1-hydroxy - 2 - (4'-methoxyphenethylamino) propyl]fluoromethanesulfonanilide.

3. Process according to claim 1, wherein a pharmaceutically acceptable acid is employed whereby a pharmaceutically acceptable acid addition salt of 2-hydroxy-5-[1-hydroxy - 2 - (4' - methoxyphenethylamino)propyl] fluoromethanesulfonanilide is produced.

4. N-benzyl-2-benzyloxy - 5 - propionylfluoromethanesulfonanilide.

5. N-benzyl-2-benzyloxy - 5 - (2 - bromopropionyl) fluoromethanesulfonanilide.

6. N-benzyl - 2 - benzyloxy-5-[2-(4'-methoxyphenethylamino)propionyl]fluoromethanesulfonanilide and acid addition salts thereof.

References Cited

UNITED STATES PATENTS

| | | | |
|---|---|---|---|
| 3,644,520 | 2/1972 | Hartley et al. | 260—556 A |
| 3,341,584 | 9/1967 | Larsen et al. | 260—556 A |
| 3,642,896 | 2/1972 | Collin | 260—247.5 R |
| 3,644,353 | 2/1972 | Lunts et al. | 260—247.5 R |

HENRY R. JILES, Primary Examiner

S. D. WINTERS, Assistant Examiner

U.S. Cl. X.R.

260—556 F, 575; 424—321